Patented Oct. 25, 1927.

1,646,553

UNITED STATES PATENT OFFICE.

JOHN R. MURLIN, OF ROCHESTER, NEW YORK.

PREPARATION OF ANTIDIABETIC MATERIAL FROM PANCREAS.

No Drawing.   Application filed March 27, 1924.   Serial No. 702,410.

This invention relates generally to the preparation of anti-diabetic material from pancreas, and its chief object is to provide for the treatment of the disease indicated an agent which can be advantageously administered to the patient by mouth. Another object is to provide a simple method of extracting the anti-diabetic substance or material and preparing the same for medicinal use by mouth administration.

To these and other ends, the invention comprises the novel features hereinafter described:

In carrying out the invention in the preferred manner, the fresh pancreas (usually from freshly killed pigs or steers) is divided into particles or bits of suitable size, say by grinding in an ordinary food chopper, and is mixed at once with dilute hydrochloric acid. The acid may be in the neighborhood of 0.2 normal strength, and at this strength an amount equal to about four times the volume of pancreas treated is in general sufficient. This mixture may now be heated to coagulate the proteins present. In most cases, a few minutes' heating at a temperature between 75° and 100° C., approximately, will give the desired result, but in any case a suitable time and temperature can be readily found by trial. A temperature within this range is also high enough to melt the fats present, as is desirable. The heated mixture may now be cooled to a point, say about 20° C., at which the fats congeal, so that they can be conveniently removed as by skimming. I prefer next to remove the coarse particles of the remaining pancreas, which removal can be effected by straining through cheesecloth or other suitable fabric.

The acidity of the liquid portion may now be adjusted to a suitable H-ion concentration, preferably about pH 4.1, determined electrometrically on the filtrate. This adjustment, effected by means of any appropriate alkali, as, for example, pure sodium hydrate in concentrated solution, results in throwing down or precipitating acid metaproteins formed in the course of the extraction, and small particles of pancreas which passed through the strainer or filter. These solids are removed by filtration, which ordinarily can be quite rapid. In general, a substantial portion of the anti-diabetic substance is contained in the filtrate, and usually enough is found in the residue to make its recovery worth while. This portion can be recovered by submitting the residue again to the extraction steps of the process one or more times as may be necessary or desirable, preferably, however, using a weaker acid solution, say 0.01 normal.

The filtrate (or the combined filtrates) obtained as above may now be combined with blood serum for oral administration or may be treated with a precipitant, in the present instance sodium chlorid, which is preferably used in amount sufficient to saturate. This has the effect of throwing down the anti-diabetic material and also more or less of any protein present. The precipitate is removed by means of a filter or centrifuge, and may then be dried.

Further purification and concentration have been accomplished in the following manner: I have found that the solution of the salt precipitate in 70 per cent alcohol may be treated with any one of the higher alcohols, n-propyl, isopropyl, n-butyl, isobutyl, n-amyl or iso-amyl alcohol, the ingredients thoroughly mixed and centrifugated whereupon the anti-diabetic substance is precipitated in a form easily separated and recovered.

For oral administration the first filtrates, or the dried salt precipitate or the dried precipitate from the higher alcohol chosen (e. g. iso-amyl alcohol) may now be mixed with a suitable amount of blood serum or of an acid or an acid salt, or with an unsaturated fatty acid, or the sodium or potassium soap of unsaturated fatty acids in amount capable of affording adequate protection against tryptic digestion and the action of other enzymes that may be encountered in the intestine. For such purpose I have successfully used weak organic acids. such as citric, malic, and tartaric. among the salts, sodium dihydrogen phosphate, and among the soaps of unsaturated fatty acids, the sodium soap of oleic acid has been found satisfactory. The mixture is preferably pressed into tablets of convenient size and these tablets covered with a suitable "enteric" coating, so-called to afford protection against gastric digestion in the stomach for a sufficient period of time, say three hours or longer. In some cases the uncompressed mixture may be administered in keratin capsules.

The results obtained by mouth administration of the product prepared as above indicate that after the protective coating or enclosure has been dissolved or removed in the intestine, the antitryptic agent associated with the anti-diabetic substance provides around the latter a localized region in the intestinal contents in which trypsin cannot act. Sufficient protection is thereby given to the anti-diabetic substance itself to permit a substantial amount of the same to be absorbed into the blood of the patient. I have found also that in some cases the absorption of the anti-diabetic substance is facilitated by administration in dilute solution of ethyl alcohol, say about 15 per cent by volume.

It is to be understood that the invention is not limited to the specific procedures and product herein described but may be carried out in other ways without departure from its spirit.

An alternative method of removing the anti-diabetic substance from the fresh pancreas which may be used, is the following. In physiological procedures the passing of a fluid through the blood vessels of an organ is known as "perfusion." Thus the excised heart of a warm blooded animal may be kept beating by perfusion of its blood vessels with a suitable fluid kept warm. Certain constituents of the liver of a warm blooded animal may likewise be washed out by perfusion of its blood vessels with a suitable fluid. I have found that it is possible to wash the anti-diabetic substance completely out of the pancreas of warm blooded animals by perfusion. The method is preferably carried out as follows: The pancreas of freshly killed animals, preferably of the pig and steer, are obtained with the blood vessels preserved. After removal of extraneous tissue the organs are suspended in a warm humid place (the viscera floor of the slaughtering establishment is a suitable place) in such a way that the arteries supplying the pancreas are exposed in a superior position. A cannula (small glass tube) is inserted into the main artery (superior pancreatico-duodenal artery) and is securely tied in place. By admitting cold normal saline into the artery under pressure the cut branches of the artery which do not supply the pancreas are discovered and ligated. The cannulated organ is then suspended over a funnel or trough in such a way that the fluid which is to be used for washing out the anti-diabetic substance is led to the cannula under a sufficient head of pressure to force it through the capillaries of the pancreas. The pressure may be supplied by gravity i. e. by sufficient elevation of a supply tank, or, by a hydraulic pump. In either case the perfusion fluid passes through the blood vessels where it is brought into diffusion relations with the cells which produce the anti-diabetic substance without displacement of these cells from their usual position, and then seeps out through the veins. The fluid drips from the veins into the funnel or trough above which the organ is suspended and from there runs by gravity into a reservoir where it is warmed to 40° to 50° C. and from which it is pumped once more directly to the arteries or to the elevated supply tank from which it runs back to the arteries. A large number of pancreases can be arranged to receive the perfusion fluid under pressure by their respective arteries simultaneously. The fluid must be circulated through the blood vessels continuously for a period preferably of two hours during which time it is kept warmed preferably to a temperature of 40° to 50° C.

A plain solution of say 0.2 per cent (twentieth normal) hydrochloric acid is used as the perfusion fluid. Ringer's solution or any other physiological salt solution acidified to approximately the same extent may also be used. The volume of the perfusion fluid must be only large enough to keep the organs continuously supplied.

When the extraction of the anti-diabetic substance is judged to be complete the entire fluid (perfusate) is assembled for further treatment. The perfusate contains a small amount of extraneous proteins which I prefer to remove. It is also preferable to use the anti-diabetic substance in concentrated form. Purification is accomplished in part by first neutralizing the excess acid with sodium hydrate solution in N/1 solution or stronger to a definite reaction of approximately pH 5.85 (electrometrically determined in the filtrate). This throws down a precipitate of proteins which carry down with them a portion of the anti-diabetic substance. Extraction of this precipitate with acidulated water (preferably .01NHCl) removes the last traces of the anti-diabetic substance. The filtrates are then combined with the perfusate for further purification as already described above.

What I claim as my invention and desire to secure by Letters Patent is:

1. The method of obtaining and purifying an anti-diabetic substance comprising extraction of the same from macerated pancreas by treatment thereof with acidulated water at a temperature adequate to effect substantial coagulation of the proteins, and subsequent precipitation of the anti-diabetic substance in conjunction with some protein from aqueous solution by means of sodium chloride, solution of the precipitate in alcohol, and reprecipitation from the alcoholic solution by means of a higher alcohol in suitable proportion and separation of the precipitate by centrifugation.

2. The method of purification of the anti-diabetic substance consisting in the precipitation of the anti-diabetic substance in conjunction with some protein from aqueous solution by means of sodium chloride, solution of the precipitate in alcohol and reprecipitation from the alcoholic solution by means of a higher alcohol in suitable proportion and separation of the precipitate by centrifugation.

3. The method of preparing an anti-diabetic substance comprising extraction of the same from macerated pancreas in aqueous solution, concentration by precipitation of the anti-diabetic substance in conjunction with some protein by means of sodium chloride, and adding thereto material capable of affording protection of the anti-diabetic substance against the digestive enzymes when the product is administered by mouth.

4. The method of preparing an anti-diabetic substance comprising extraction of the same from macerated pancreas in aqueous solution, precipitating and removing the anti-diabetic substance from the solution by means of sodium chloride, and adding thereto material of acid reaction capable of affording protection of the anti-diabetic substance against intestinal digestion when administered by mouth.

5. The method of preparing for administration by mouth an anti-diabetic substance obtained in solid form from the pancreas by extraction in acid aqueous solution and precipitation with sodium chloride, comprising adding to the solid substance material capable of affording protection against intestinal digestion and enclosing the combined solids in a covering capable of affording protection against gastric digestion.

6. A product capable of causing utilization of sugar in the human system, consisting of the anti-diabetic substance generated by the pancreas and obtained as a powder capable of being pressed into a tablet and combined with a substance which will delay or prevent destruction or inactivation of the anti-diabetic substance by trypsin or other enzyme of the intestine and thereby enable it to be absorbed from the human intestine.

7. A product capable of causing the utilization of sugar in the human system consisting of the anti-diabetic substance generated by the pancreas and obtained as a powder capable of being pressed into a tablet and combined with an acid or acid salt which will delay or prevent destruction or inactivation of the anti-diabetic substance by trypsin or other enzyme of the intestine and thereby enable it to be absorbed from the human intestine.

JOHN R. MURLIN.